(12) United States Patent
Van de Wetering et al.

(10) Patent No.: US 7,685,770 B2
(45) Date of Patent: Mar. 30, 2010

(54) BIODEGRADABLE PLANTERS

(75) Inventors: Jack Van de Wetering, Baiting Hollow, NY (US); Shantha Athalage, Iselion, NJ (US)

(73) Assignees: Ivy Acres, Inc., Baiting Hollow, NY (US), part interest; Excelhigh, Inc., New York, NY (US), part interest ( * ) Notice: Subject to any disclaimer, the term of this patent is extended or adjusted under 35 U.S.C. 154(b) by 0 days.

(21) Appl. No.: 11/716,524

(22) Filed: Mar. 9, 2007

(65) Prior Publication Data

US 2008/0155898 A1      Jul. 3, 2008

Related U.S. Application Data

(63) Continuation-in-part of application No. 11/646,187, filed on Dec. 27, 2006.

(51) Int. Cl.
*A01G 23/02* (2006.01)
*B29C 67/24* (2006.01)

(52) U.S. Cl. .......................................... 47/74; 264/330
(58) Field of Classification Search .................. 47/65.5, 47/65.7, 74; 264/109, 134, 239, 299, 330
See application file for complete search history.

(56) References Cited

U.S. PATENT DOCUMENTS

| 1,931,248 | A | * | 10/1933 | Bryant | 47/9 |
| 2,848,842 | A | * | 8/1958 | Tennant, Jr. | 47/65.7 |
| 4,242,161 | A | * | 12/1980 | Hulten et al. | 156/197 |
| 5,523,331 | A | * | 6/1996 | Ezoe | 524/25 |
| 6,408,568 | B1 | * | 6/2002 | Kusey et al. | 47/9 |
| 2002/0157309 | A1 | * | 10/2002 | Wibmer | 47/65.7 |

* cited by examiner

*Primary Examiner*—Michael R Mansen
*Assistant Examiner*—Monica L Williams
(74) *Attorney, Agent, or Firm*—Thomas A. O'Rourke; Bodner & O'Rourke, LLP

(57) ABSTRACT

A biodegradable planter made from straw and coir is described. The composition is made from a blend of about 1 to about 99% straw and 99% to about 1% coir. The planter is sprayed on at least one surface with a latex. Preferably it is sprayed with a natural latex.

13 Claims, 3 Drawing Sheets

BIODEGRADABLE PLANTERS

This application is a continuation-in-part of U.S. application Ser. No. 11/646,187, filed Dec. 27, 2006, the disclosures of which are incorporated herein by reference.

FIELD OF INVENTION

The present invention relates to improved biodegradable containers for planting or displaying plants. The present invention also has applicability as a pot or container in connection with seed generation. The wall and base of the container is preferably made of a blend of rice straw and other natural fibers, in particular coir. The container will disintegrate in the ground, within shorter periods of time than conventional biodegradable containers.

BACKGROUND OF THE INVENTION

Many people do not have a great deal of time these days for gardening. In addition, many people do not want to wait for the seeds to germinate and grow and prefer to purchase seedlings from a garden center or other retail establishment. Retail plants are frequently sold in plastic trays where there are a plurality of recesses where planting mix or other soil mixture is placed and the seedlings are grown. Other planters include peat pots i.e. containers made from pressed peat moss. These pots may be made from other materials as well.

When the gardener purchases these seedlings, they typically either pull out the seedling from the plastic tray and plant it in a suitable location in the garden. Alternatively, where the seedling is in a plantable container, the entire container is put into the ground.

There are still a number of gardeners and homeowners who prefer to grow their own seedlings over buying commercially produced plants. This poses many advantages to the gardener; he no longer has to wait for commercial plants to become available, there is less danger of getting diseased plants, home-produced transplants grow better after being set in the garden, because they are frequently better cared for.

Usually transplanting a seedling involves removing the plant from a small planter once its first true leaves have developed. The gardener must then gently pull the small plant form its original planter being careful not to break the stem or damage the roots as this occurrence will prevent the plant from reoccurring. Another method for transplanting seedlings into the ground is using a disintegrateable pot to plant the seedling and then planting the seedling with the pot in the ground. The pot will dissolve into the ground. Some pots will allow the roots to grow through the pot as it decomposes. The decomposition process for the commercially available pots is usually slow and sometimes an entire growing season or more will pass, after the pot has been planted with the pot made of peat moss or other materials still intact. In the fall or early spring when the garden is being cleaned up for the next season, many of the annuals that were planted in pots still have their pots present. These non decomposed pots are a burden to remove from the soil.

Another problem that is encountered with some of the prior planters is that they disintegrate too quickly and are difficult to handle when the gardener tries to plant the seedlings. Moisture from watering the plants can dissolve some planters too quickly and cause the pot to tear or fall apart when it is lifted for planting. There is a need for a container which will disintegrate into the ground quickly, allowing the plant to grow and the roots to spread without interfering in the plants growth. Although other biodegradable pots may be available they do not decompose as quickly. This is an issue primarily with annuals as the dead plants must be removed each year and the plants must be replaced Rice straw is the stalk of a dead rice plant. Rice straw is unique in that it is more sturdy then other types of straw. There are many viable uses for rice straw including, straw bale building, fiberboard construction panels, door cores, community perimeter walls and highway sound walls, Newsprint, specialty paper, consumer product packaging. Rice straw is also used for controlling erosion and sediment. In packed form, rice straw has low thermal conductivity, i.e. it is a good insulator. Rice straw has a high ash content (up to 22%) and low protein content. As a result, rice straw does not decompose as readily as other straw from other grain crops such as wheat or barley.

Coconut fiber, known as coir is another natural fiber. Coir is a versatile natural fiber extracted from mesocarp tissue, or husk of the coconut fruit generally fiber is of golden color when cleaned after removing from coconut husk. Brown coir is used in brushes, doormats, mattresses and sacking. A small amount is also made into twine. Pads of curled brown coir fiber, made by needle-felting are shaped and cut to fill mattresses and for use in erosion control on river banks and hillsides. The material is also used for insulation and packaging. Coir pots for plants are available in the market but they do not decompose quickly. The major use of white coir is in rope manufacture. Mats of woven coir fiber are made from the finer grades of bristle and white fiber using hand or mechanical looms. Coir is recommended as substitute for milled peat moss because it is free of bacteria and fungal spores.

OBJECTS OF INVENTION

It is an object of the invention to provide biodegradable planters which will dissolve in the ground more quickly than traditional planters.

It is an object of the invention to provide biodegradable planters that are sturdy during planting and will not up tear or otherwise fall apart prematurely.

It is also an object of the invention to allow an individual to transfer seedling plants to the ground without damaging the seedling.

It is also an object of the invention for the seedling planter not to interfere with the growth of the plant roots once it is planted in the ground.

SUMMARY OF INVENTION

The present invention provides for an improved biodegradable planter made of a combination of rice straw and coconut fiber. This combination provides a material which is ideally sturdy enough to support the seedling while the seedling is being planted by the gardener yet disintegrate quickly in the ground once it is planted. Depending on the combination of rice straw and coconut fibers the container can disintegrate in as little as two months time or sooner which is a significant improvement over prior planters which could take a year or more. Ideal proportions of rice straw and coir can result in planters which will decompose quickly in the ground yet remain sturdy for the duration of the plant growth. The planter of the present invention decomposes quicker when natural soils are used in the container as opposed to an artificial planting medium.

The composition of the present invention is a blend of 1% to 99% straw and 99% to 1% coir. A preferred straw is rice straw. The preferred proportion of rice straw to coconut fiber is anywhere between 50%-99% rice straw and with the remainder being coir. A more preferred proportion is between 70%-90% rice straw and between 10% and 30% coir. The most preferred combination is between 75%-85% rice straw combine with 15%-25% coir, this will lead to a pot which will decompose in a reasonable amount of time, yet retain its structure for planting, approximately 2 months.

DETAILED DESCRIPTION OF THE INVENTION

Figure 1:
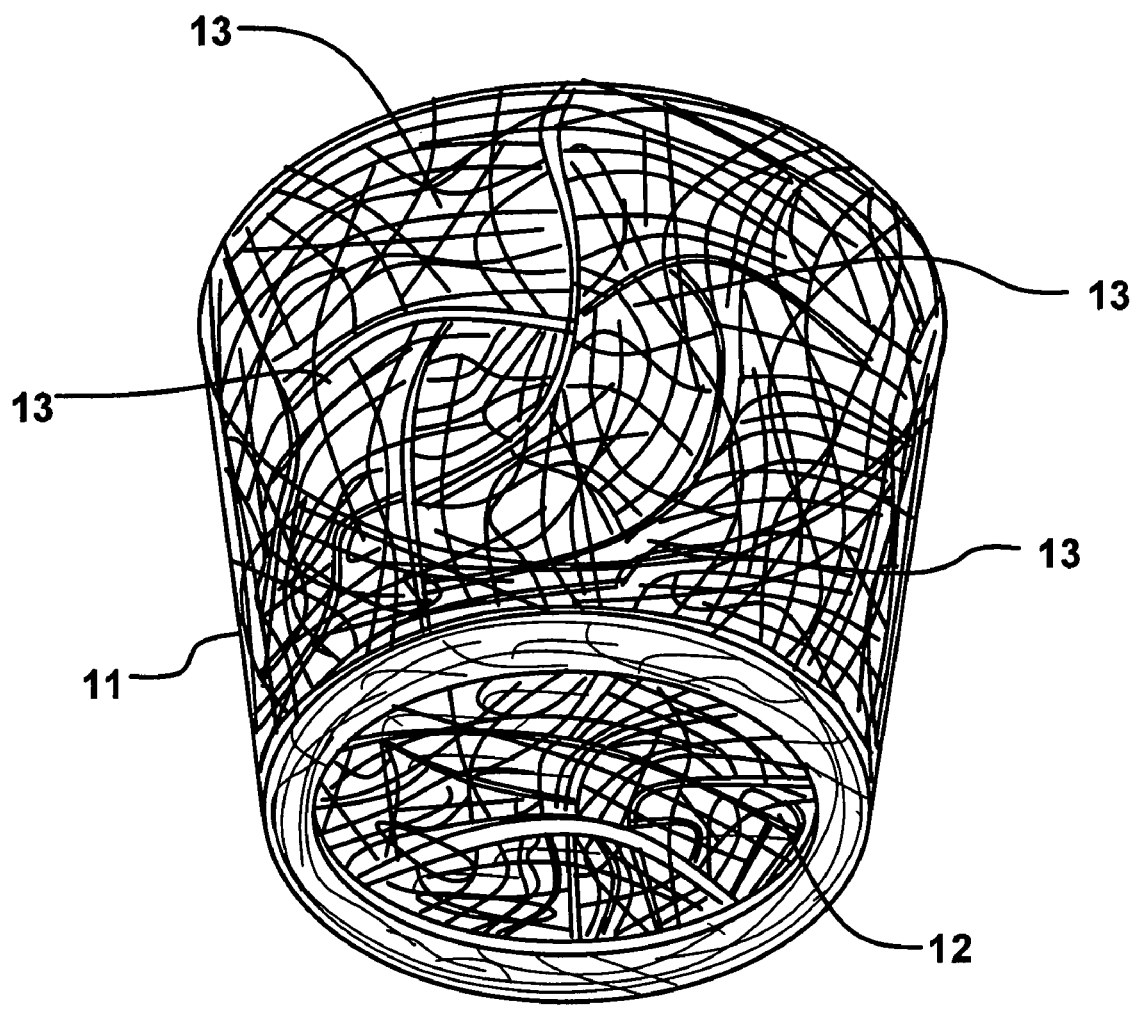
FIG. 1 is a side view of a representative planter made from the composition of the present invention.
Figure 2:
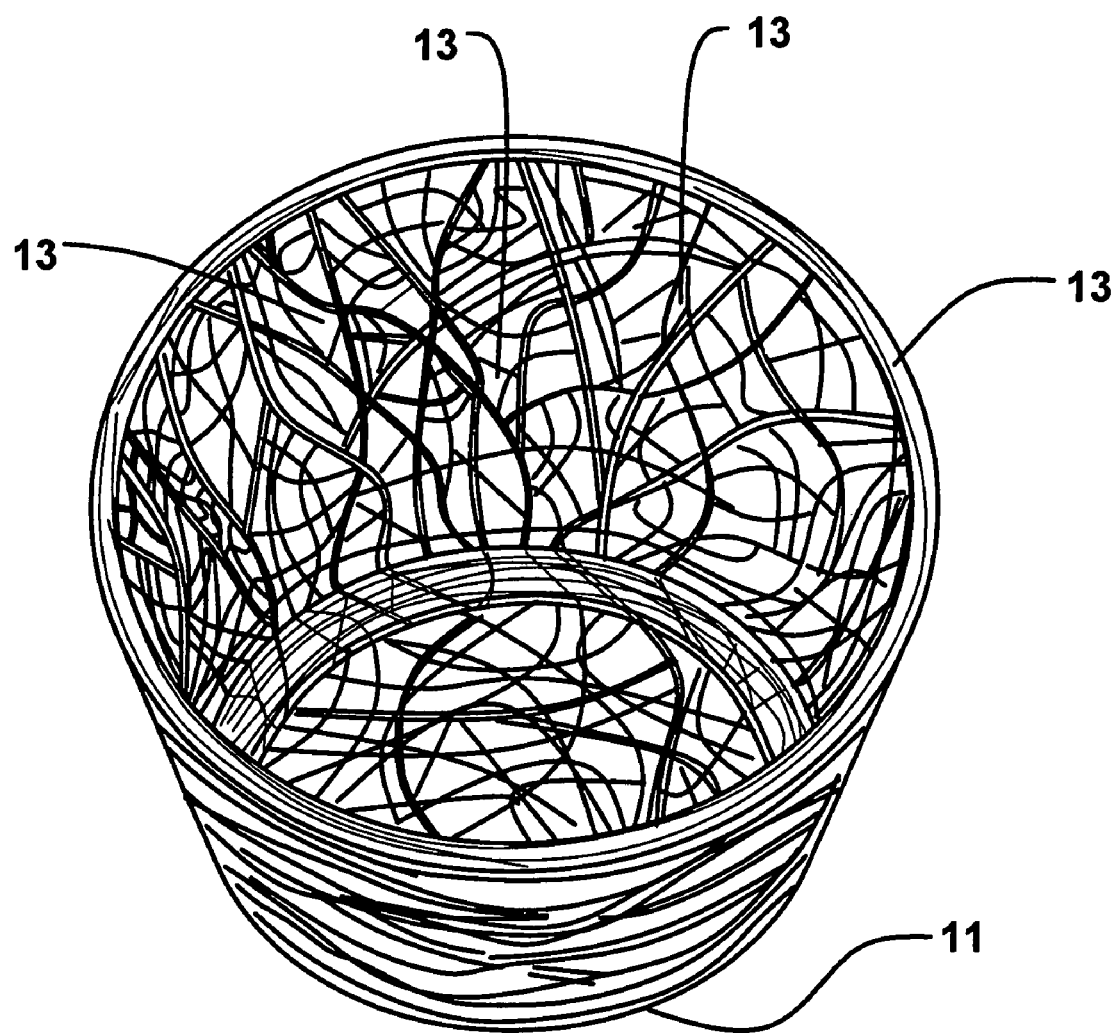
FIG. 2 is a top perspective view of the planter of the present invention.

As required, detailed embodiments of the present invention are disclosed herein; however, it is to be understood that the disclosed embodiments are merely exemplary of the invention, which may be embodied in various forms. Therefore the specific structural and functional details disclosed herein are not to be interpreted as limiting but merely as a basis for the claims and as a representative basis for teaching one skilled in the art to variously employ the present invention in virtually any appropriately detailed structure.

The first step in manufacturing the straw coir pot of the present invention is to clean the coir and straw to remove the impurities and metals that are present in the materials as these impurities may impede plant growth. One preferred coir is Cocos Nusiferra). The coconut fiber is torn from the Epicarp (husk) of the coconut. Once cleaned the straw and coir are mixed in a vat to blend the materials together. The preferred embodiment is rice straw (also known as Oriza Sataiva) but any straw may be used. Rice straw is the dried stem of the paddy. Next the straw coir mixture is fed into a hackle drum which forms into long sheets of coir and straw material. The hackle drum presses the mixture by a series of rollers which progressively squeeze the blend into thinner and thinner sheets. Once the mixture is pressed, one or both sides of the sheet is sprayed with a natural or synthetic latex which binds the materials in the blend together. It has been found that only one side of the sheet needs to be sprayed with latex. Although both natural latex and synthetic latex may be used, natural latex is preferred as there are fewer impurities that may have a deleterious effect on plant growth. The sheet then passes through a dryer preferably at 120 degrees Celsius for ten minutes, to cure the rubber on the latex fiber mix. To form the planters of the present invention, the sheets are cut into required sizes, for example, in a band saw machine and the thin pressed sheet is then placed over a mold which has the shape that is desired for the resulting pot. A mandrel ram forces the sheet of straw and coir to take the shape of the mold while under high pressure usually at about 120 degrees Celsius for about 5 minutes; lastly the top edge of the pot is cut.

The planters of the present invention may be made with thinner side walls than conventional planters. This is ideal for allowing water as well as other nutrients to enter through the sidewalls. The resulting side walls also typically have a plurality of small scattered, randomly arranged orifices or voids, thus allowing water to access the surface of the fibers permitting the walls to decompose faster. These voids are typically not circular or uniform in size and shape. The base is preferably as thick as the side walls or thicker. In one embodiment, the base does not have the orifices or voids present in the side walls. In another embodiment, there are voids or orifices in the base as in the side walls. The more sturdy base of the pot allows the planter to remain structurally sound during planting, yet decompose quickly once placed in the ground. The spraying of latex onto the straw coir sheets can also add durability to the pots as it makes the walls and base of the pot more flexible, thereby less brittle.

Figure 3:
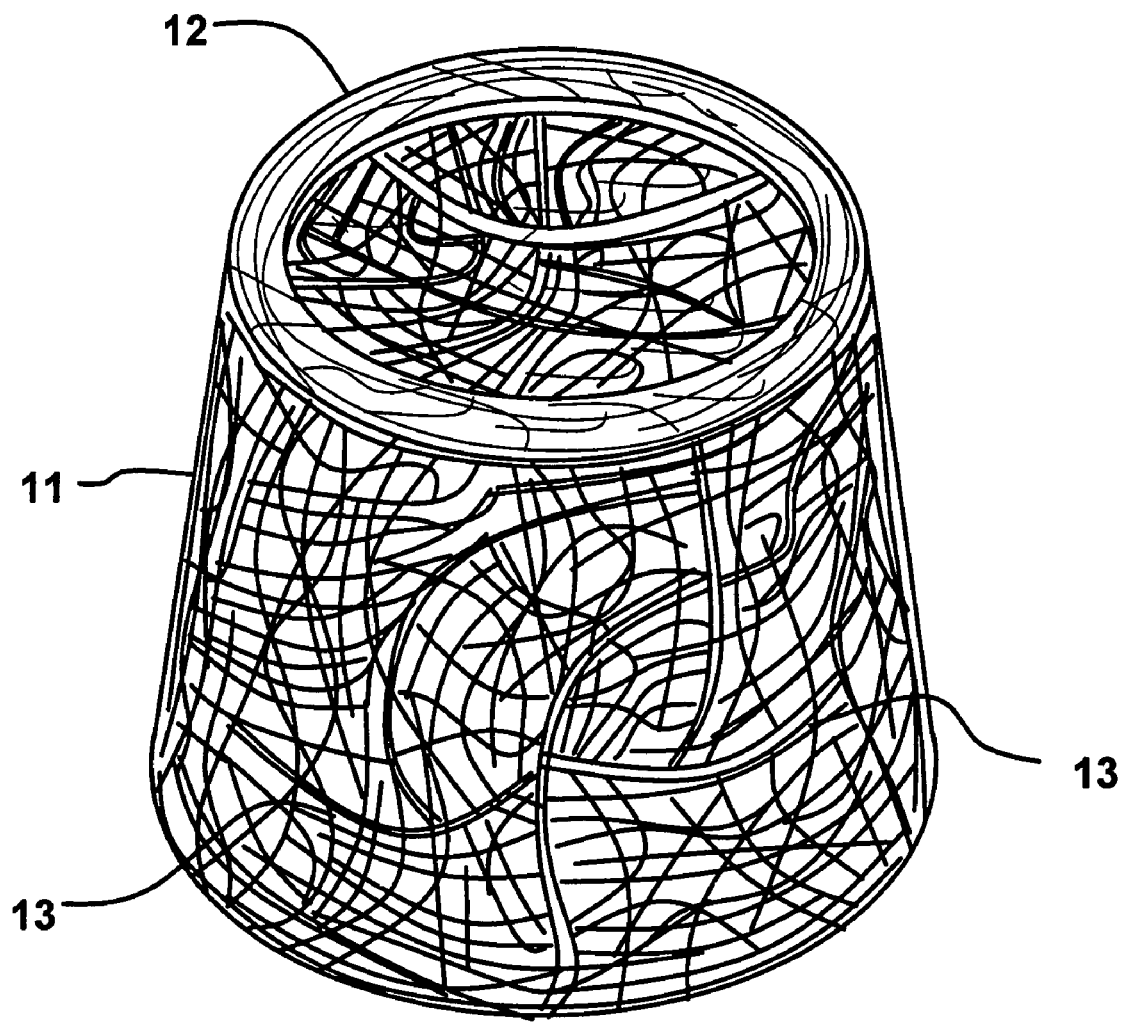
FIG. 3 is a bottom perspective view of the planter of the present invention.

As seen in FIG. 1 there is a container 10 of the present invention. The container 10 is round but it will be appreciated that other shapes are possible. The container has at least one sidewall 11 and a bottom wall 12. As can be seen from the drawing, the sidewall has a plurality of fibers. These fibers are a blend of straw and coir. The sidewall 11 of the container has a plurality of orifices 13 in the sidewall. As can be seen these orifices or voids are randomly positioned throughout the sidewall and are of different sizes and shapes depending on how the fibers are positioned during the forming of the container. As can be seen from the embodiment of FIG. 3 the bottom wall does not have the voids or orifices that are found in the sidewalls 11.

The composition of the present invention is a blend of 1% to 99% straw and 99% to 1% coir by weight. A preferred straw is rice straw. The preferred proportion of rice straw to coconut fiber is anywhere between 50%-99% by weight rice straw and with the remainder being coir. A more preferred proportion is between 70%-90% by weight rice straw and between 10% and 30% by weight coir. The most preferred combination is between 75%-85% by weight rice straw combine with 15%-25% by weight coir, this will lead to a pot which will decompose in a reasonable amount of time, yet retain its structure for planting, approximately 2 months.

Several embodiments were measured in order to obtain the thickness of the side wall and determine an average thickness. A Parker Hannfin-Deadal digital micrometer with a resolution of 0.001 mm was employed. Several measurements, typically at least 7 measurements of each sample embodiment were taken, using the micrometer at different points. The data was collected and the average thickness of each embodiment was calculated. An average thickness of the sample embodiments was also calculated by averaging the average thickness of each embodiment. The average thickness among several embodiments was found to be 1.7 mm. In one embodiment the average thickness of the sidewall was less than 3 mm. In another embodiment the average thickness of the sidewall was less than 2.75 mm. In still a further embodiment the average thickness of the sidewall was less than 2.5 mm. In a preferred embodiment the thickness of the sidewall was less than 2.25 mm. In a most preferred embodiment the average thickness of the sidewall is less than 1.90 mm.

Density of several embodiments was calculated using its given mass. The formula used to calculate Density was $D=M/V$. The volume was calculated using $V=3.14(r^2)(H)$ for the cylinder shaped embodiments. Since the radius at both ends of the cylinder are not the same the calculation was done twice, once the density was calculated using each radius measurement they two values were averaged to find an average density of the container. Density of the cube shaped pots was calculated using the same formula for density ($D=M/V$). The volume was found using the formula $V=(L)(W)(H)$. Since the pot was not a perfect cube the volume was calculated twice using each base, each volume calculation was used to calculate density. The two calculated densities were then averaged together to find the average density of the pot.

The rice straw coir combination once molded into the shape of the pot have an average density ranging from about 0.026 g/mm$^3$ to about 0.0528 g/mm$^3$. This low density allows the walls to be permeated by the surrounding moisture and nutrients in the soil. This also allows the decomposition of the wall to occur quickly. The combination of an extended surface area created by the scattered orifices and the low density of the material will allow the fast possible decomposition of the pot underground. Many types will fertilizer will also assist in the speed of the decomposition. In the process of decomposition, bacteria, fungi, molds, protozoa, actinomycetes, and other saprophytic organisms feed upon decaying organic materials initially, while in the later stages of decomposition mites, millipedes, centipedes, springtails, beetles and earthworms further breakdown and enrich the composting materials. Another advantage of the natural fiber decomposing in the soil is that it acts as compost, the nutrients from the natural fibers decomposes and fertilizes the soil surrounding the plant.

The present invention can also be used to make trays which can carry a plurality of planters of the present invention. The trays can be made of the straw coir blend and have a top surface with, a handle or other carrying means attached. The top surface has a plurality of openings for receiving pots such as pots of the present invention. Alternatively, the tray may have one or more recesses for receiving pots.

What is claimed is:

1. A method of forming a biodegradable planter comprising cleaning coir and straw to remove impurities and metals that impede plant growth blending straw and coir so that the mixture has a composition of about 1 to about 99% straw and about 99 to about 1% coir, Pressing said blend to form a sheet Applying a latex coating to only one side of said sheet Passing said sheet through a dryer set to a temperature to cure said latex coating Forming said sheet into a biodegrable planter by placing said sheet over a mold that has the shape of a resulting pot and forcing said sheet into said mold by a mandrel ram, said planter having a base and one or more sidewalls, said sidewalls having orifices allowing for root permeability, said sidewalls not interfering with said plant roots once said planter is planted in the ground, and wherein the density of said entire sidewall is less than the density of said entire base.

2. The method according to claim 1 wherein said blend of coir and straw are pressed by a series of rollers progressively squeezing the blend into thinner and thinner sheets.

3. The method according to claim 2, wherein said sidewall has a thickness in the range of about 1.7 mm to about 3 mm.

4. The method according to claim 2, wherein said sidewall has a density of from about 0.026 $g/mm^3$ to about 0.528 $g/mm^3$.

5. The method according to claim 4 wherein said sidewalls have scattered randomly arranged orifices to allow water to access the surface of the fibers permitting the walls to decompose.

6. The method according to claim 5 wherein said planters is a single use planter that is directly planted in the soil.

7. The method according to claim 1, wherein said temperature of said dryer is set to a temperature of at least 120 degrees Celsius.

8. The method according to claim 1, wherein said latex coating is cured for at least ten minutes.

9. The method according to claim 1, wherein said sheet is molded by said mandrel ram at a temperature of at least 120 degrees Celsius.

10. The method according to claim 9, wherein said sheet is molded under an air pressure which is greater than atmospheric pressure.

11. The method according to claim 10, wherein said sheet is molded for at least 5 minutes.

12. The method according to claim 10, wherein said base and said sidewall are formed from a single sheet and said sidewall and base form a continuous member.

13. The method according to claim 10, wherein said sidewall and base form a continuous member.

* * * * *